(12) United States Patent
Bangur et al.

(10) Patent No.: US 8,924,958 B1
(45) Date of Patent: Dec. 30, 2014

(54) APPLICATION PLAYER

(75) Inventors: Ambreesh Bangur, Gurgaon (IN);
Shashi Kant Sharma, Gurgaon (IN);
Harvinder Singh Sawhney, Gurgaon (IN)

(73) Assignee: BlueStack Systems, Inc., Campbell, CA (US)

( * ) Notice: Subject to any disclaimer, the term of this patent is extended or adjusted under 35 U.S.C. 154(b) by 168 days.

(21) Appl. No.: 13/479,056

(22) Filed: May 23, 2012

Related U.S. Application Data

(60) Provisional application No. 61/489,611, filed on May 24, 2011, provisional application No. 61/489,615, filed on May 24, 2011.

(51) Int. Cl.
*G06F 9/44* (2006.01)
*G06F 9/445* (2006.01)

(52) U.S. Cl.
USPC ............................ 717/178; 717/168; 717/174

(58) Field of Classification Search
None
See application file for complete search history.

(56) References Cited

U.S. PATENT DOCUMENTS

| | | | |
|---|---|---|---|
| 7,647,491 B2 | 1/2010 | Kawano et al. | |
| 7,987,432 B1 | 7/2011 | Grechishkin et al. | |
| 7,987,459 B2 * | 7/2011 | Chow et al. | 717/174 |
| 8,117,554 B1 | 2/2012 | Grechishkin et al. | |
| 8,161,275 B1 | 4/2012 | Woodward | |
| 8,332,936 B1 * | 12/2012 | Hackborn et al. | 717/178 |
| 8,438,375 B1 | 5/2013 | Woodward | |
| 8,448,160 B2 * | 5/2013 | Vincent et al. | 717/168 |
| 8,594,649 B2 * | 11/2013 | Kwon et al. | 717/178 |
| 8,726,263 B2 * | 5/2014 | Rangarajan et al. | 717/168 |
| 8,732,697 B2 * | 5/2014 | Jonnala et al. | 717/178 |
| 2005/0114870 A1 | 5/2005 | Song et al. | |
| 2006/0212865 A1 * | 9/2006 | Vincent et al. | 717/168 |
| 2008/0133903 A1 | 6/2008 | Sun et al. | |
| 2008/0141244 A1 * | 6/2008 | Kelley | 717/178 |
| 2008/0216071 A1 | 9/2008 | Gidalov | |
| 2009/0210702 A1 * | 8/2009 | Welingkar et al. | 713/168 |
| 2009/0241104 A1 * | 9/2009 | Amiga et al. | 717/174 |
| 2010/0162233 A1 * | 6/2010 | Ku et al. | 717/174 |

(Continued)

OTHER PUBLICATIONS

RapidValue, "How to Choose the Right Architecture for Your Mobile Application", Nov. 2012, RapidValue Solutions, pp. 1-16; <http://www.rapidvaluesolutions.com/wp-content/uploads/2013/04/How-to-Choose-the-Right-Technology-Architecture-for-Your-Mobile-Application.pdf>.*

(Continued)

*Primary Examiner* — Thuy Dao
*Assistant Examiner* — Ben C Wang
(74) *Attorney, Agent, or Firm* — Haverstock & Owens LLP

(57) ABSTRACT

Embodiments of the present invention are directed to an application broker, which can be a program on a client device, a service in a cloud accessible by the client device or both. The client device typically runs a guest environment in a host environment. A user is able to search for an application on the application broker configured to interface with one or more application sources. In some embodiments, the application broker is able to intelligently search, download and/or install the application in the guest operating system of the client device with minimal or no user intervention. The application is typically executed in an application player associated with the guest environment. In some embodiments, the application player is configured as the application broker. In some embodiments, the application broker can provide suggested applications to download when the client device is communicatively coupled with the one or more application sources.

12 Claims, 6 Drawing Sheets

(56) References Cited

U.S. PATENT DOCUMENTS

| | | |
|---|---|---|
| 2010/0199037 A1 | 8/2010 | Umbehocker et al. |
| 2011/0016299 A1 | 1/2011 | Galicia et al. |
| 2011/0035355 A1 | 2/2011 | Sagar et al. |
| 2011/0082900 A1 | 4/2011 | Nagpal et al. |
| 2011/0126216 A1 | 5/2011 | Galicia et al. |
| 2011/0173602 A1* | 7/2011 | Togami et al. ................ 717/178 |
| 2011/0276621 A1 | 11/2011 | Edery et al. |
| 2011/0302630 A1 | 12/2011 | Nair et al. |
| 2011/0307354 A1* | 12/2011 | Erman et al. .................. 717/178 |
| 2012/0011551 A1 | 1/2012 | Levy et al. |
| 2012/0023507 A1 | 1/2012 | Travis |
| 2012/0042159 A1 | 2/2012 | Liu |
| 2012/0066675 A1 | 3/2012 | Shelansky et al. |
| 2012/0079095 A1 | 3/2012 | Evans et al. |
| 2012/0086716 A1 | 4/2012 | Reeves et al. |
| 2012/0089906 A1 | 4/2012 | Reeves et al. |
| 2012/0089992 A1 | 4/2012 | Reeves et al. |
| 2012/0110315 A1* | 5/2012 | Lee ............................... 713/100 |
| 2012/0110496 A1 | 5/2012 | Lee et al. |
| 2012/0116905 A1* | 5/2012 | Futty et al. ................... 705/26.1 |
| 2012/0143900 A1* | 6/2012 | Ainslie et al. ................. 707/769 |
| 2012/0191961 A1 | 7/2012 | Wu et al. |
| 2012/0216181 A1 | 8/2012 | Arcese et al. |
| 2012/0272233 A1* | 10/2012 | Lee ................................ 717/178 |
| 2012/0303476 A1* | 11/2012 | Krzyzanowski et al. .... 705/26.5 |
| 2013/0024778 A1 | 1/2013 | Reeves et al. |
| 2013/0047150 A1 | 2/2013 | Malasky et al. |
| 2013/0054952 A1 | 2/2013 | Shen |
| 2013/0074069 A1 | 3/2013 | Li |
| 2013/0081008 A1* | 3/2013 | Rangarajan et al. .......... 717/168 |
| 2013/0095785 A1* | 4/2013 | Sadana et al. ................. 455/406 |
| 2013/0139182 A1* | 5/2013 | Sethuraman et al. ......... 719/320 |
| 2013/0268397 A1* | 10/2013 | Mehta et al. ................. 705/26.7 |
| 2014/0007084 A1* | 1/2014 | Ding ............................. 717/178 |
| 2014/0007222 A1 | 1/2014 | Qureshi et al. |
| 2014/0059536 A1* | 2/2014 | Hiratsuka et al. ............. 717/178 |

OTHER PUBLICATIONS

Ki et al., "Poster: Retro: An Automated, Application-Layer Record and Replay for Android", 2014 ACM, MobiSys'14, Jun. 16-19, 2014, Bretton Woods, New Hampshire, USA, p. 373; <http://dl.acm.org/results.cfm?h=1&cfid=417717926&cftoken=68174932>.*

Wu et al., "Scaling Social Media Applications Into Geo-Distributed Clouds", Mar. 12, 2014 IEEE, pp. 1-14; <http://ieeexplore.ieee.org/stamp/stamp.jsp?tp=&arnumber=6766261>.*

* cited by examiner ated Systems," and U.S. Provisional Patent Application Ser.
APPLICATION PLAYER

RELATED APPLICATIONS

This application claims benefit of priority under 35 U.S.C. section 119(e) of the U.S. Provisional Patent Application Ser. No. 61/489,611, filed May 24, 2011, entitled "Switch Operating Systems," and U.S. Provisional Patent Application Ser. No. 61/489,615, filed May 24, 2011, entitled "App Store Broker," which are both hereby incorporated by reference in their entirety.

FIELD OF THE INVENTION

The present invention is related to the field of applications. More specifically, the present invention relates to an application broker.

BACKGROUND OF THE INVENTION

An app store is an online application distribution system, which allows a user to search and download any desired application. Examples of an app store include, but are not limited to, the Amazon Appstore and the Mac App Store. Although numerous app stores exist today, a single app store, however, may not have an application that the user is specifically looking for. Feeling frustrated, the user may spend more time to look for it elsewhere or simply give up. Even if the app store does have the application that the user is specifically looking for, another app store may have the same application at a lower price or for free. The user may pay more for the application than what he could have gotten the application for had the user searched elsewhere. After the user finds the application to download, the user may have to download the application to a transitory device before transferring to an ultimate device that is capable of running the application. For example, the user may have to download an application on the user's personal computer from the iTunes Store before transferring the application to the user's iPhone. Completing such a process even by a user who is tech-savvy can be time consuming, tedious and frustrating at times.

The present invention addresses at least these limitations in the prior art.

SUMMARY OF THE INVENTION

Embodiments of the present invention are directed to an application broker, which can be a program on a client device, a service in a cloud accessible by the client device or both. The client device typically runs a guest environment in a host environment. A user is able to search for an application on the application broker configured to interface with one or more application sources. In some embodiments, the application broker is able to intelligently search, download and/or install the application in the guest operating system of the client device with minimal or no user intervention. The application is typically executed in an application player associated with the guest environment. In some embodiments, the application player is configured as the application broker. In some embodiments, the application broker can provide suggested applications to download when the client device is communicatively coupled with the one or more application sources.

In one aspect, a non-transitory computer-readable medium storing instructions that, when executed by a computing device supporting a first operating system and a second operating system, cause the computing device to perform a method. The method includes receiving a search text on a broker platform configured to interface with at least one application source, and searching, using the search text, in the at least one application source. The method also includes displaying at least one application that is specific to the second operating system and based on the search text. Information of the at least one application can be displayed. One or more sources of the at least one application are not displayed. Alternatively, the one or more sources of the at least one application are displayed.

In some embodiments, the method further includes displaying one or more suggested applications. Each of the suggested applications is specific to the second operating system. The one or more suggested applications can be displayed based on a ranking methodology. The ranking methodology can be based on relatedness, importance, popularity, and listing price.

In some embodiments, the method further includes downloading and installing one of the at least one application, and executing the at least one application on the computing device in an application player associated with the second operating system. In some embodiments, the application player includes the broker platform. In some embodiments, the one of the at least one application is downloaded and installed with minimal or no user intervention.

In some embodiments, the method further includes automatically selecting an application source to download from. The automatic selection can be based on at least one factor, such as cost. In some embodiments, the method further includes displaying in the application player the downloaded and installed application. In some embodiments, the method further includes invoking a payment workflow.

In another aspect, a non-transitory computer-readable medium storing instructions that, when executed by a computing device supporting a first operating system, cause the computing device to perform a method. The method includes communicatively coupling with a source device supporting a second operating system. The source device can be a personal computer, a tablet, a mobile device, or any suitable device capable of storing data, such as applications that are specific to the second operating system. The method also includes synching at least one application that is specific to the second operating system from the source device, and displaying the at least one application in an application player. The application player includes a broker platform configured to interface with at least one application source. In some embodiments, the at least one application source is automatically pre-selected, is selected by a user of the computing device, or both. In some embodiments, the application player is associated with the second operating system.

The broker platform is configured to search for applications from the at least one application source. In some embodiments, the broker platform is configured to intelligently select an application to be downloaded from one of the at least one application source. In some embodiments, the broker platform is configured minimize user intervention during a download and installation of an application from one of the at least one application source. In some embodiments, the broker platform is configured to invoke a payment workflow.

In some embodiments, the method further includes launching the second operating system specific application from the application player. In some embodiments, the method further includes executing the second operating system specific application in the application player.

In some embodiments, the method further includes using a feature on the source device. The feature on the source device can be G.P.S., an accelerometer, a camera, a microphone or any feature on the source device.

In yet another aspect, a non-transitory computer-readable medium storing instructions that, when executed by a computing device, cause the computing device to perform a method. The method includes presenting an application broker configured to interface with at least one application source to retrieve an application that is specific to a guest operating system. The application is typically configured to run in an application player associated with the guest operating system.

In some embodiments, the application player is configured as the application broker. In some embodiments, the application broker is a program launched from and executed on the computing device, which is a client device. Alternatively or in addition to, the application broker is a service in a cloud and is accessible by the client device.

In some embodiments, the application broker implements one or more monetization schemes utilized by the application broker.

In yet another aspect, a system includes at least one application source and an application broker. The application broker is typically communicatively coupled with the at least one application source and configured to interface with the at least one application source to retrieve applications therefrom. The system also includes a computing device configured to access, via the application broker, an application that is specific to an operating system that is a guest on the computing device. The application is configured to run in an application player associated with the guest operating system. The guest operating system can be the same as or different from a host operating system In some embodiments, the application broker is a program executed on the computing device. Alternatively or in addition to, the application broker is a service in a cloud. In some embodiments, the application player is configured as the application broker.

In some embodiments, the application broker is configured to list any application residing on the computing device that is related to the guest operating system.

In some embodiments, the application broker utilizes one or more monetization schemes.

BRIEF DESCRIPTION OF THE DRAWINGS

Reference will now be made in detail to implementations of the present invention as illustrated in the accompanying drawings. The same reference indicators will be used throughout the drawings and the following detailed description to refer to the same or like parts.

DETAILED DESCRIPTION OF THE INVENTION

In the following description, numerous details are set forth for purposes of explanation. However, one of ordinary skill in the art will realize that the invention may be practiced without the use of these specific details. Thus, the present invention is not intended to be limited to the embodiments shown but is to be accorded the widest scope consistent with the principles and features described herein.

Embodiments of the present invention are directed to an application broker, which can be a program on a client device, a service in a cloud accessible by the client device or both. The client device typically runs a guest environment in a host environment. A user is able to search for an application on the application broker configured to interface with one or more application sources. In some embodiments, the application broker is able to intelligently search, download and/or install the application in the guest operating system of the client device with minimal or no user intervention. The application is typically executed in an application player associated with the guest environment. In some embodiments, the application player is configured as the application broker. In some embodiments, the application broker can provide suggested applications to download when the client device is communicatively coupled with the one or more application sources.

Figure 1:
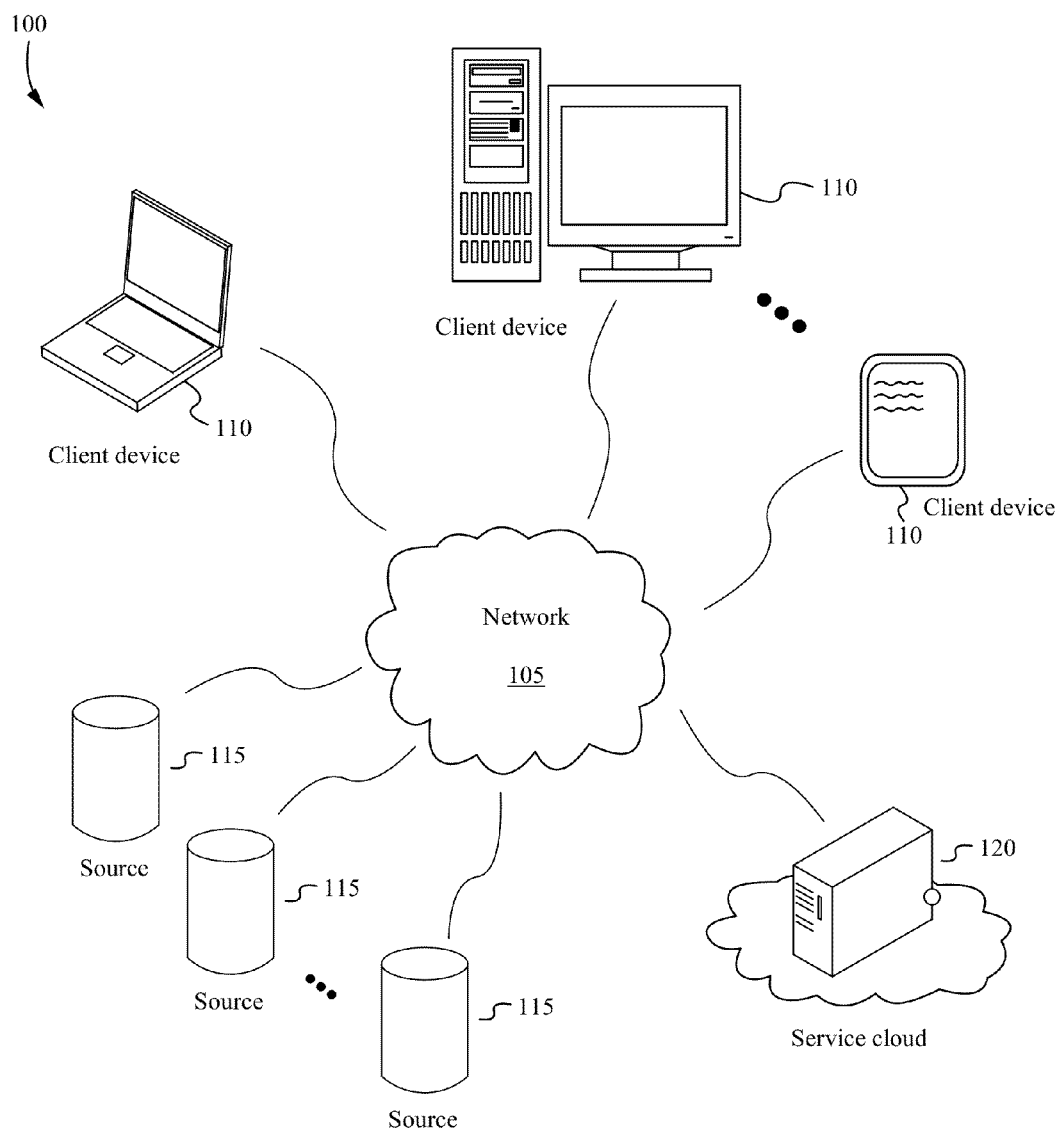
FIG. 1 illustrates an overview of an exemplary system for implementing an embodiment of the present invention.

FIG. 1 illustrates an overview of an exemplary system 100 for implementing an embodiment of the present invention. As shown in FIG. 1, the system 100 includes at least one client device 110. A client device 110 can be a mobile device, a personal computer, a tablet or any suitable network-enabled device. A client device 110 is communicatively coupled with a network 105, and accesses an application broker configured to receive and/or send data from/to one or more application sources 115 via the network 105. In some embodiments, the application broker is a program on the client device 110. Alternatively or in addition to, the application broker is a service in a cloud 120. It will be understood that the network 105 can be a local area network (LAN), a wireless local area network (WLAN), a wide area network (WAN), a metropolitan area network (MAN), an Internet network, a cellular network maintained by a cellular carrier, such as a global system for mobile communications (GSM) or code division multiple access (CDMA) network, and/or some other wired or wireless communications link. Users are able to use client devices 110 to access and retrieve applications from the one or more application sources 115.

Figure 2:
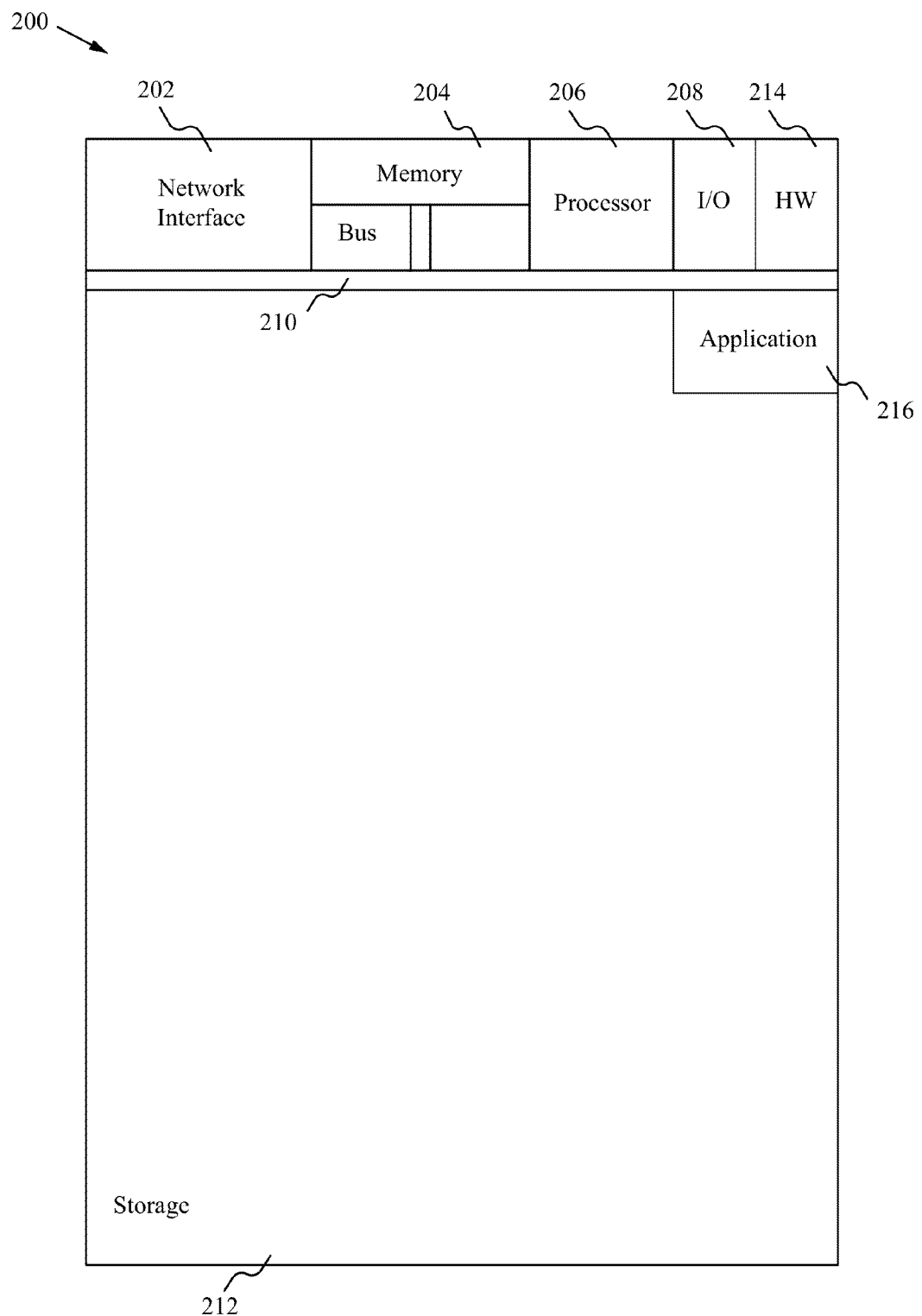
FIG. 2 illustrates a block diagram of an exemplary computing device configured to implement an application broker in accordance with the present invention.

FIG. 2 illustrates a block diagram of an exemplary computing device 200 configured to implement an application broker in accordance with the present invention. The computing device 200 is able to be used to acquire, cache, store, compute, search, transfer, communicate and/or display information. For example, the computing device 200 is a client device that has software that implements the application broker. For another example, the computing device 200 is a client device that accesses the application broker as a service in a cloud. For yet another example, the computing device 200 is a server that provides the application broker as a service in a cloud, wherein the service is accessible by a client device.

In general, a hardware structure suitable for implementing the computing device 200 includes a network interface 202, a memory 204, processor(s) 206, I/O device(s) 208, a bus 210 and a storage device 212. The choice of processor is not critical as long as a suitable processor with sufficient speed is chosen. In some embodiments, the computer device 200 includes at least two processors 206. The memory 204 is able to be any conventional computer memory known in the art. The storage device 212 is able to include a hard drive, compact disc read only memory (CDROM), compact disc rewritable (CDRW), digital video disk (DVD), digital video disk rewritable (DVDRW), flash memory card, random access memory (RAM), read only memory (ROM), erasable programmable read only memory (EPROM), electrically erasable programmable read only memory (EEPROM) or any other storage device. The computing device 200 is able to include one or more network interfaces 202. An example of a network interface includes a network card connected to an Ethernet or other type of LAN. The I/O device(s) 208 are able to include one or more of the following: keyboard, mouse, monitor, display, printer, modem, touchscreen, button interface and other devices. Application(s) 216 used by the application broker are likely to be stored in the storage device 212 and memory 204 and are processed by the processor 206. More or less components shown in FIG. 2 are able to be included in the computing device 200. In some embodiments, hardware 214 for application broker is included. Although the computing device 200 in FIG. 2 includes applications 216 and hardware 214 for the application broker, the application broker is able to be implemented on a computing device in hardware, firmware, software or any combination thereof.

Application Player

In some embodiments, a client device supports a plurality of operating systems, including a host operating system and at least one guest operating system. The host operating system can be the same as or different from each guest operating system. In the foregoing discussion, assume that the host operating system on the client device is a WINDOWS 7 operating system and that a guest operating system on the client device is an ANDROID operating system.

Figure 3:
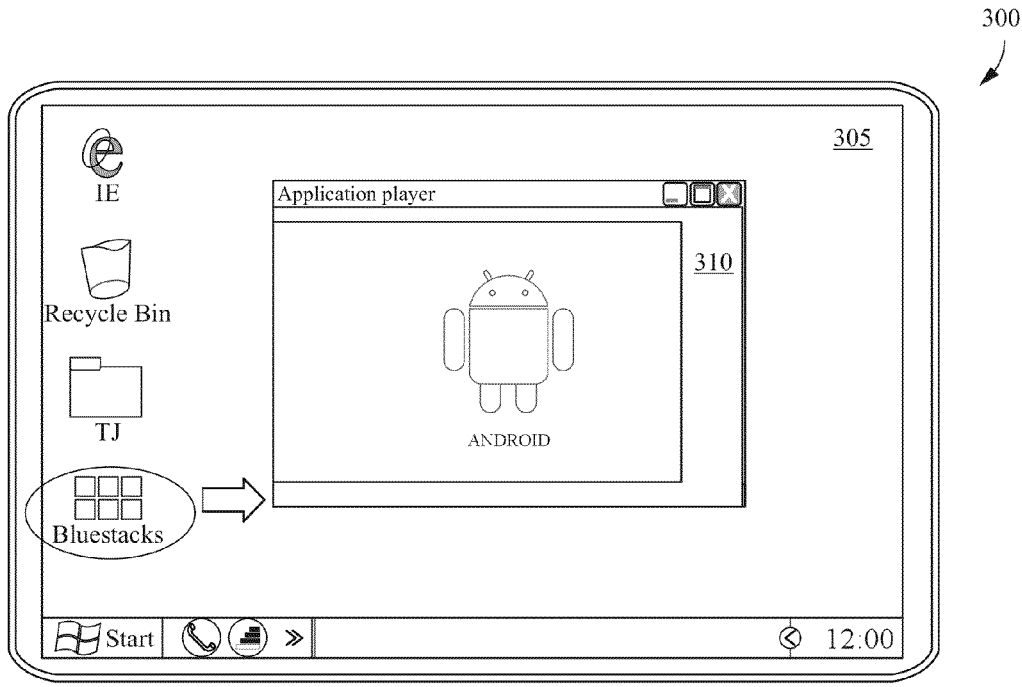
FIG. 3 illustrates an exemplary application player within a host environment in accordance with the present invention.

FIG. 3 illustrates an exemplary application player 310 within a host environment 305. In FIG. 3, the guest ANDROID operating system is launched in the application player 310 within the host WINDOWS 7 operating system environment 305. The application player 310 is associated with the guest ANDROID operating system. In some embodiments, the application player 310 is an overlay in the host environment 305. An overlay can be a window, a browser, a player or the like. An exemplary application player is disclosed in co-pending application Ser. No. 13/479,086, filed May 23, 2012 and entitled "Apparatuses, Systems and Methods of Switching Operating Systems," which is hereby incorporated by reference. In some embodiments, the application player 310 is configured to list any application residing in the client device that is related to the guest ANDROID operating system.

Figure 4:
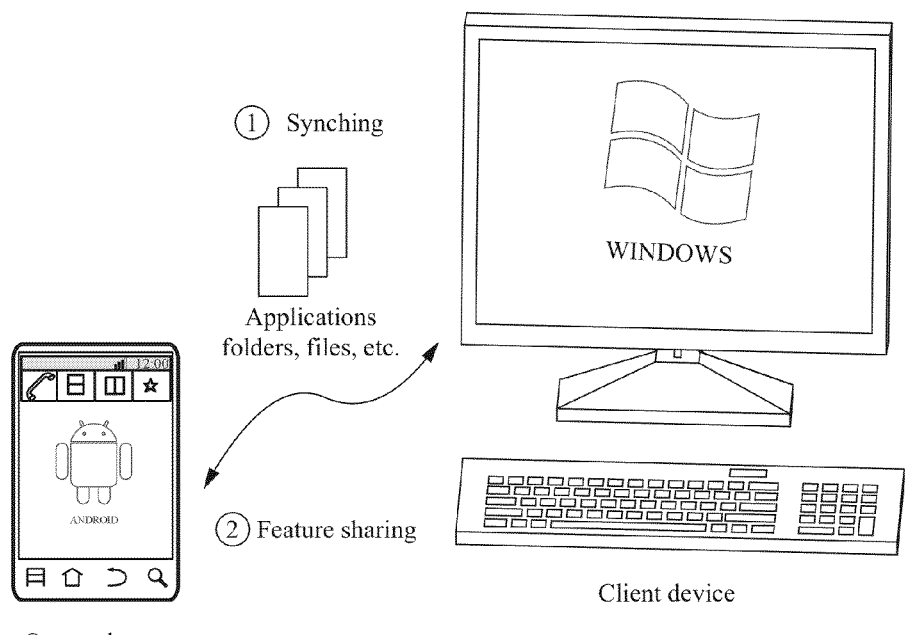
FIG. 4 illustrates a client device coupling a smart phone in accordance with the present invention.

In some embodiments, the client device is able to communicatively couple with another device (e.g., a smart phone) running an operating system that is the same as the guest operating system on the client device. In this example, the smart phone is running an ANDROID operating system. Once the client device and the smart phone are communicatively coupled, the client device and the smart phone can be synched and/or share features, as illustrated in FIG. 4. For example, Ninja Rush, an ANDROID operating system application, on the smart phone can be synched to the client device. After synching, Ninja Rush is displayed as an installed application in, among other places, the application player. The user is able to launch Ninja Rush in the application player on the client device from either the host environment or guest environment.

The application player on the client device can also utilize features of the smart phone. For example, if the client device does not have a location sensor, then the client device, when communicatively coupled with the smart phone, can use a location sensor of the smart phone. Other features of the smart phone include, but are not limited to, an accelerometer, a camera and a microphone.

Application Broker

The application player can also be configured as an application broker. The application broker typically interfaces with at least one application source. An application source is an online application distribution system. Amazon Appstore, Mac App Store, Handango, Freeware Lovers, Google Play and GetJar are such online application distribution systems. In some embodiments, the application broker is configured to interface with one or more pre-selected application sources. However, at any time, the user is able to configure more or less application sources that the application broker interfaces with. The application broker is configured to search for applications from the one or more application sources. Typically, the application broker receives a search text as input by, for example, the user, and searches based on the search text, the one or more application sources. The application broker is configured to minimize and eliminate user intervention as much as possible during a search, a download and/or installation of an application from an application source. The connection between the application broker and the one or more application sources can be configured on an application by application basis or for all applications.

Figure 5:
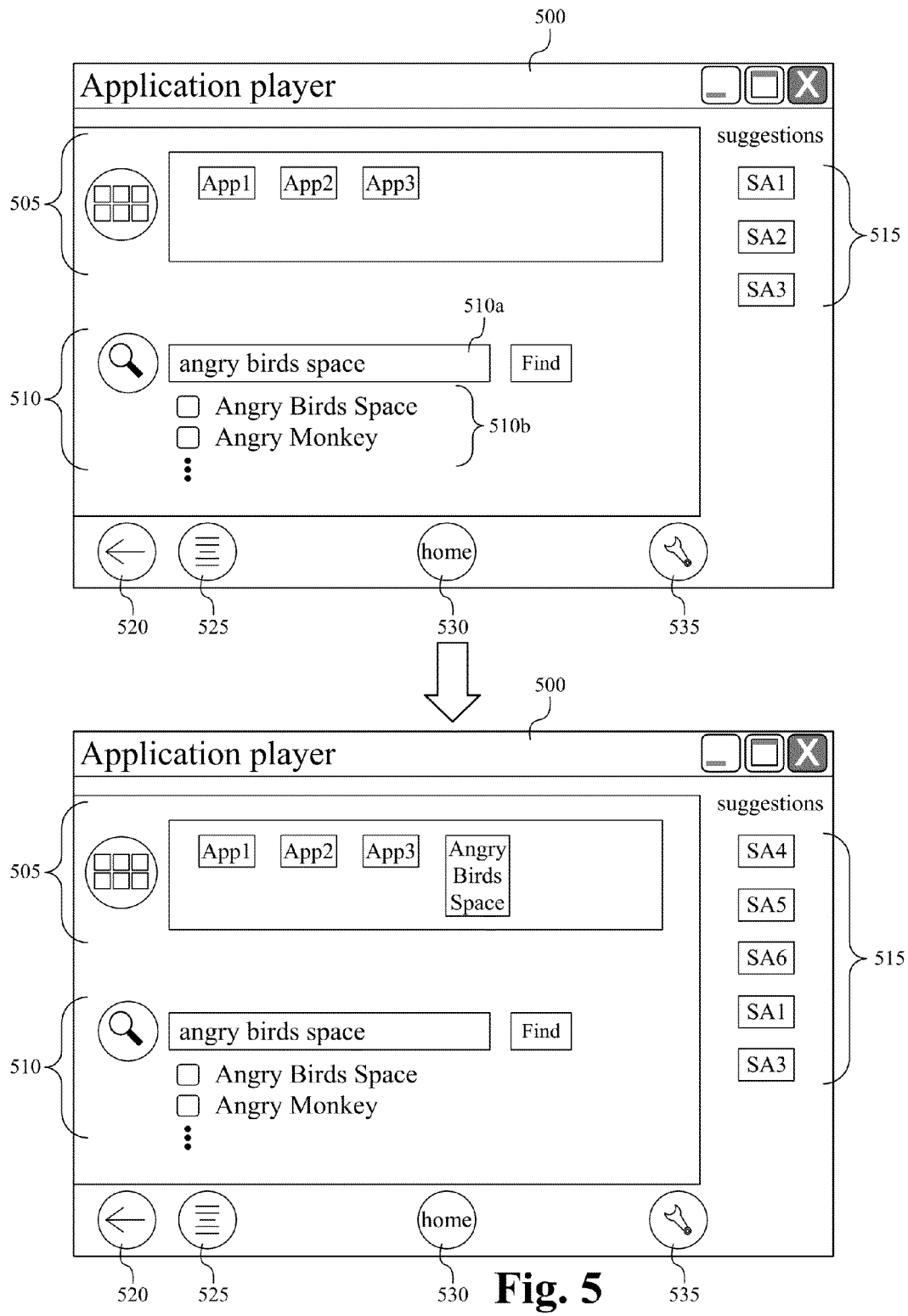
FIG. 5 illustrates an exemplary application broker in accordance with the present invention.

FIG. 5 illustrates an exemplary application broker 500 in accordance with the present invention. The application broker 500 includes a first area 505 which displays any installed guest ANDROID operating system specific applications, e.g., App1, App2 and App3, on the client device. The installed guest ANDROID operating system specific applications can include those that are pre-installed with the application player, those previously installed by the user and/or both. In some embodiments, the installed guest operating system specific applications are listed in a particular order, such as usage.

The application broker 500 also includes a second area 510 which allows the user to search for an application from the one or more application sources. In FIG. 5, "Angry Birds Space" is input as a search text in a search field 510*a*. After receiving the search text, the application broker 500 typically intelligently searches, using the search text, the one or more application sources. In other words, the application broker 500 knows to search only for applications that are guest ANDROID operating system specific applications. If no matching results are found, a message indicating such is displayed below the search field 510*a*. Similarly, any results 510*b* based on the search text are typically displayed below the search field 510*a*. Each result 510*b* is typically associated with a guest ANDROID operating system application and is based on the search text.

In some embodiments, the search is transparent to the user. The application broker 500 will search in all configured application sources. However, the results 510*b* are displayed without telling the user the one or more applications sources that offer each result 510*b*. In some embodiments, a description of each result 510*b* is shown. Descriptions can include publisher information, metatdata or other relevant data regarding the results that help the user decide which application to download and install.

The application broker 500 also includes a third area 515 which displays a set of one or more suggested applications, e.g., SA1, SA2 and SA3. The suggested applications can be determined based on the currently running application, existing installed applications, the search text, the search results, a monetization scheme or a combination thereof. In some embodiments, the third area 515 is periodically refreshed with another set of one or more suggested applications. In some embodiments, the suggested applications only include guest ANDROID operating specific applications. In some embodiments, the suggested applications are listed in a particular order, such as popularity, cost of application, relatedness, importance and listing prices. As shown in the bottom application broker 500 of FIG. 5, the third area 515 displays another set of suggested applications, e.g, SA4, SA5, SA6, SA1 and SA3. In some embodiments, the third area 515 is associated with an up/down scroll bar and/or a left/right scroll bar.

The application broker 500 also includes a back button 520, a menu button 525, a home button 530 and a settings button 535. The back button 520 allows the user to go back to a previous page or view. The menu button 525 displays a menu. The home button 520 allows the user to go back to a home screen of the application broker 500. The settings button 535 allows the user to configure application player settings, including connecting to another device, e.g., the smart phone in FIG. 4, changing language, changing keyboard settings, managing applications, changing application size and configuring application sources.

Assume the user clicks on or otherwise activates the first result, Angry Birds Space, shown in the second area 510. In some embodiments, the application broker 500 will intelligently select an application source to download the application from and will download the application therefrom. If Amazon Appstore and GetJar are both configured application sources that offer Angry Birds Space, the application broker 500 will intelligently select one of them to download the application from based on one or more factors, e.g., cost of application. For example, the application broker 500 will automatically download and install the application from Amazon Appstore because Amazon Appstore's current promotion includes offering the application for free, whereas GetJar is offering the application for $1.99. Alternatively, the user is able to select which of the application sources, Amazon Appstore or GetJar, to download the application from. For example, the user selects GetJar to download the application from because the user has a GetJar gift certificate that the user wants to use. Once Angry Birds Space is downloaded and installed in the guest environment, Angry Birds Space is shown as an installed application in the first area 505 of the application broker 500. Typically, a corresponding icon is shown in the first area 505.

In some embodiments, the application broker 500 will invoke a payment workflow the very first time the user is required to purchase an application. User intervention is thus required. However, the payment workflow can thereafter be automated if the user saves payment information to be used in future purchases.

Figure 6:
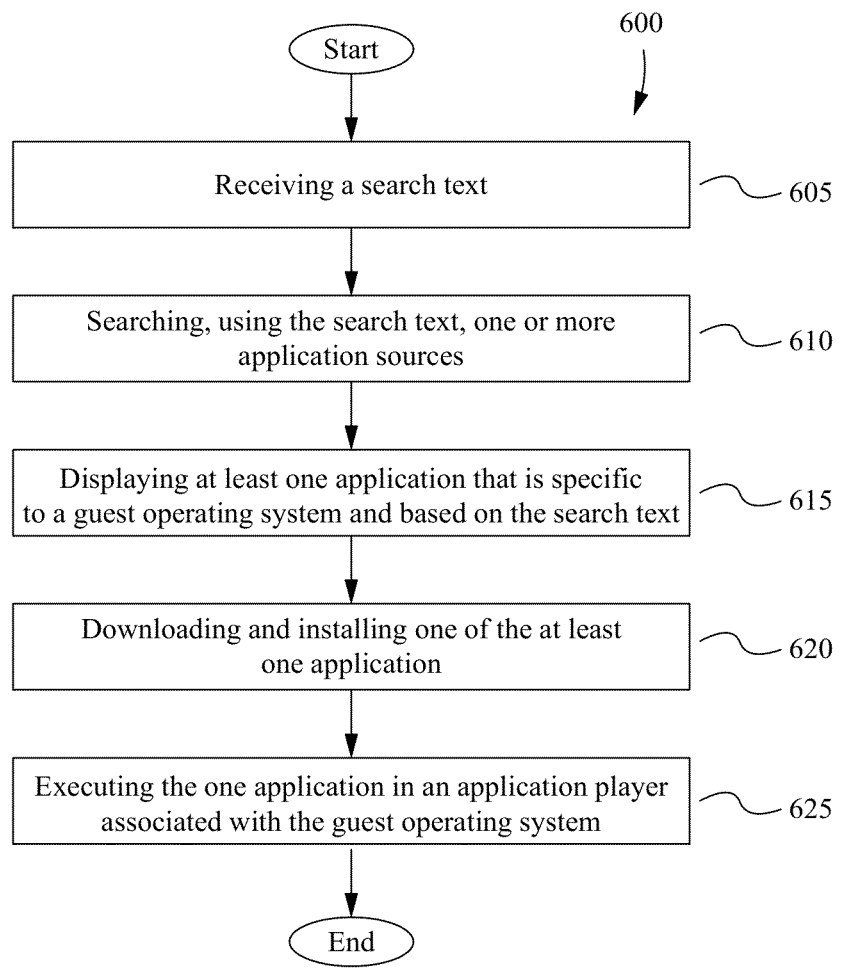
FIG. 6 illustrates a method of retrieving an application retrieved from an application source in accordance with the present invention.

FIG. 6 illustrates a method 600 of retrieving an application retrieved from an application source in accordance with the present invention. Assume the user launches on a client device an application broker configured to implement the method 600. In some embodiments, the application broker is as a program executable on the client device. Alternatively, the application broker is a service in a cloud accessible by the client device. The client device typically supports a first operating system (e.g., host WINDOWS 7 operating system) and a second operating system (e.g., guest ANDROID operating system).

The method 600 begins at a step 605 where a search text is received in the application broker configured to interface with at least one application source. Typically, the search text is input by the user in search of an application specific to the guest ANDROID operating system.

At a step 615, at least one application that is specific to the guest ANDROID operating system and based on the search text is displayed as part of the results.

At a step 610, the application broker searches, using the search text, in the at least one application source. The application broker can be configured with one or more preselected application sources. In addition, the user is able to configure the application broker to include more or less application sources of his or her own choice.

At a step 615, at least one application that is specific to the guest Android operating system and based on the search text is displayed as part of the results.

When the user selects one of the results, at a step 620, the corresponding application downloads and installs in the guest operating system. In some embodiments, the installation require little or no user intervention. In some embodiments, a payment workflow is invoked during installation. Once downloaded and installed, the application will be indicated as such in the application broker.

When the user activates the installed application, at a step 625, the application is executed within the application player associated with the guest ANDROID operating system. In some embodiments, the application player is configured as the application broker. After the step 625, the method 600 ends.

Figure 7:
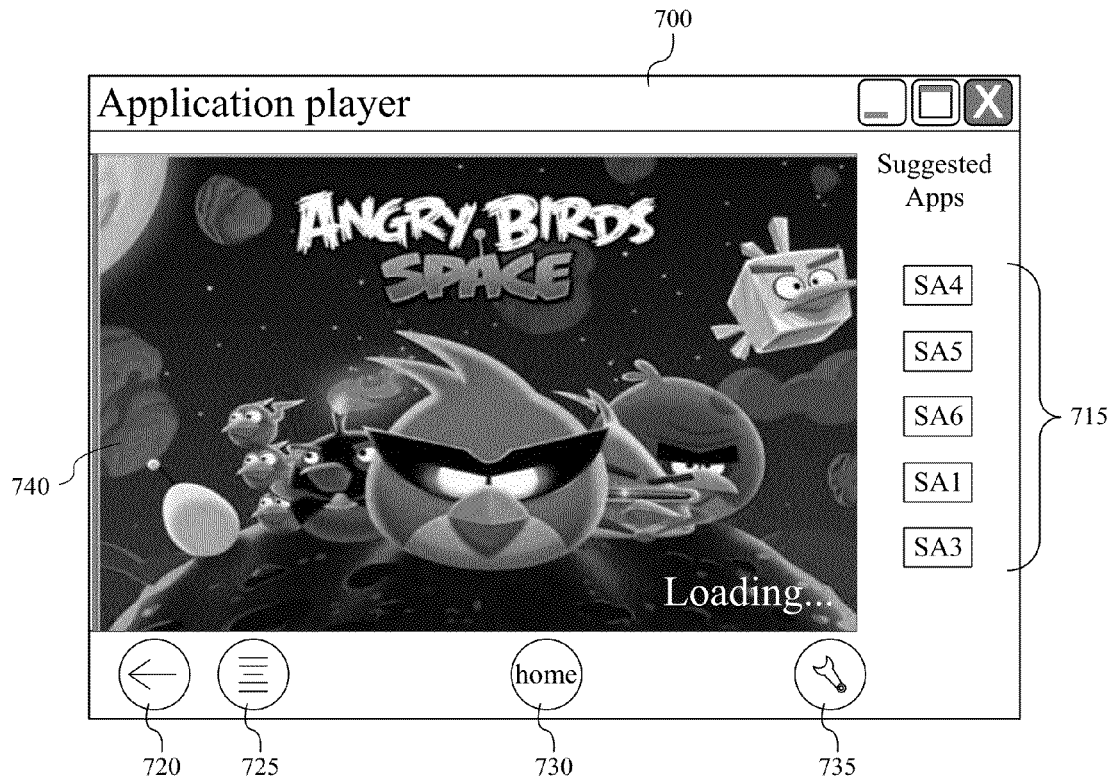
FIG. 7 illustrates an exemplary application executing within an application player in accordance with the present invention.

FIG. 7 illustrates an exemplary application 740 executing within an application player 700 in accordance with the present invention. Assume the user activates the icon associated with Angry Birds Space from the application player. Angry Birds Space 740 launches from within the application player 700 and is executed therein. In some embodiments, once Angry Birds Space 740 is launched, suggested applications are shown in an area 715 of the application player 700. The area 715 is similarly configured as the third area 515 of the application broker 500. In some embodiments, the third area 715 is continuously refreshed during game play. A back button 720, a menu button 725, a home button 730 and a settings button 735 are also displayed during game play, and are similarly configured as the back button 520, the menu button 525, the home button 530 and the settings button 535, respectively, of the application broker 500.

Although FIG. 7 is shown as running a single application within the application player 700, it is contemplated that a plurality of applications can concurrently run within the application player 700 at the same time. Alternatively, each application runs in an instance of the application player 700.

Monetization

The application broker can implement one or more monetization schemes. For example, referring back to FIG. 5, the third area 515 of the application broker 500 is real estate that utilizes a monetization scheme. As discussed elsewhere, the third area 515 displays one or more suggested applications that are typically guest ANDROID operating system specific applications. A developer of an application can pay an agreed-to amount to have an application displayed in the third area 515. The higher the display position is in the third area 515, the higher the real estate cost is. Other monetization schemes include, but are not limited to, pay per click, pay per impression, flat rate and subscription.

The first area 505 of the application broker 500 is also real estate that utilizes a monetization scheme. As discussed elsewhere, the first area 505 displays any installed guest ANDROID operating system specific applications, which can include those that come pre-installed with the application player. Similarly, a developer of an application can pay an agreed-to amount to have the application come pre-installed with the application player.

The application player can also implement one or more monetization schemes. For example, referring now to FIG. 7, the area 715 of the application player 700 is real estate that utilizes a monetization scheme. As discussed elsewhere, the area 715 displays one or more suggested applications, such as cross promotional applications. When Angry Birds Space is running in the application player 700, a family of one or more applications involved in the cross promotion with Angry Birds Space is listed in the area 715. If the user clicks on one of these applications in the area 715 during game play, then a payout associated with the cross promotion is triggered.

Figure 8:
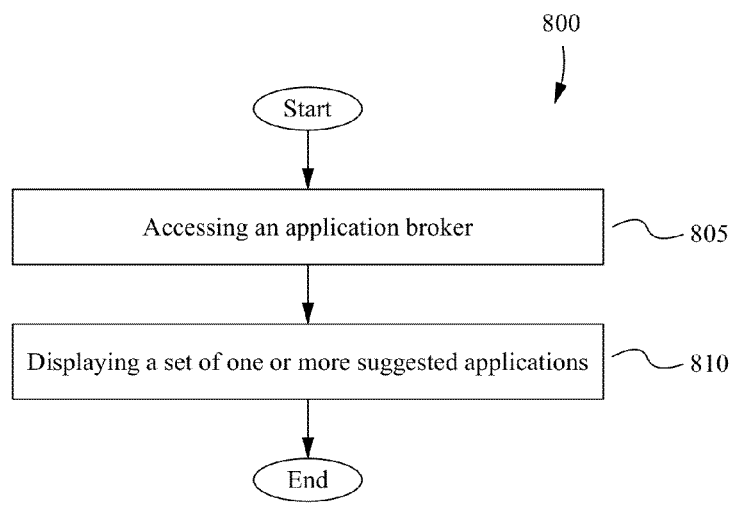
FIG. 8 illustrates a method of utilizing a monetization scheme in accordance with the present invention.

FIG. 8 illustrates a method 800 of utilizing a monetization scheme in accordance with the present invention. The method 800 begins at a step 805, where an application broker is accessed on the client device supporting the host WINDOWS 7 operating system and guest ANDROID operating system. As discussed elsewhere, the application broker can be a program running on the client device. In some embodiments, an application player is configured as the application broker. Alternatively or in addition to, the application player is a service in a cloud that is accessible by the client device.

In some embodiments, the application broker is able to perform the method 600 of FIG. 6. As such, the application broker is able to search, download and install an application that is specific to the guest ANDROID operating system on the client device.

At a step 810, a set of one or more suggested applications is displayed in the application broker. In some embodiments, the set is displayed in the third area of the application broker. The one or more suggested applications are displayed based on at least one monetization scheme. The monetization scheme can be based on cost of a real estate property in the application broker. Alternatively, the monetization scheme is based on cross promotional agreements. In some embodiments, the set is periodically refreshed with other suggested application(s). After the step 810, the method 800 ends.

Embodiments of the present invention are directed toward an application broker, which is an interface to one or more application sources. The choice of application source can be transparent to an end user. Furthermore, the choice of application source can be different for different applications. The application broker allows the end user to search for an application that is a guest operating system specific application for downloading and installation, and to execute an application therefrom. In some embodiments, the application broker implements one or more monetization schemes.

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A non-transitory computer-readable medium storing instructions including a broker platform that, when executed by a computing device supporting a first operating system, cause the computing device to perform a method comprising:

a. receiving a search text with the broker platform, wherein the broker platform is configured to operate on the first operating system and interfaces with a plurality of application sources;
   b. searching each of the application sources with the broker platform and returning a results list based on the search text and a second operating system different than the first operating system, wherein the results list comprises one or more entries representing one or more applications from the application sources that are both configured to operate on the second operating system and associated with the search text;
   c. displaying a refined results list with the broker platform, wherein the refined results list is determined by excluding duplicate entries from the results list that represent applications from two or more of the application sources such that each of the one or more applications are represented only a single entry;
   d. downloading and installing one of the at least one application; and
   e. executing the at least one application on the computing device in an application player associated with the second operating system, wherein the application player includes the broker platform.

2. The non-transitory computer-readable medium of claim 1, wherein the method further comprises displaying one or more suggested applications, wherein each of the suggested applications is specific to the second operating system.

3. The non-transitory computer-readable medium of claim 2, wherein the one or more suggested applications are displayed based on a ranking methodology.

4. The non-transitory computer-readable medium of claim 3, wherein the ranking methodology is based on at least one of relatedness, importance, popularity, and listing price.

5. The non-transitory computer-readable medium of claim 1, wherein the method further comprises minimizing or eliminating user intervention during the downloading and installing step.

6. The non-transitory computer-readable medium of claim 1, wherein the method further comprises automatically selecting an application source to download from.

7. The non-transitory computer-readable medium of claim 6, wherein the automatic selection is based on at least one factor.

8. The non-transitory computer-readable medium of claim 7, wherein the at least one factor includes cost.

9. The non-transitory computer-readable medium of claim 1, wherein the method further comprises displaying in the application player the downloaded and installed application.

10. The non-transitory computer-readable medium of claim 1, wherein the method further comprises invoking a payment workflow.

11. The non-transitory computer-readable medium of claim 1, wherein information of the at least one application is displayed.

12. The non-transitory computer-readable medium of claim 1, wherein one or more sources of the at least one application are not displayed.

* * * * *